United States Patent [19]

Taylor

[11] 4,266,393

[45] May 12, 1981

[54] SESAME SEED HARVESTER

[76] Inventor: Clyde L. Taylor, 1545 Chinoworth St., Visalia, Calif. 93277

[21] Appl. No.: 101,553

[22] Filed: Dec. 7, 1979

Related U.S. Application Data

[63] Continuation of Ser. No. 907,760, May 19, 1978, abandoned.

[51] Int. Cl.$^3$ ............................................. A01F 11/00
[52] U.S. Cl. .................................. 56/14.6; 130/27 P; 130/30 E
[58] Field of Search ............ 130/27 R, 27 H, 27 HA, 130/27 P, 30 E; 56/14.6, 126–130, 122–125

[56] References Cited

U.S. PATENT DOCUMENTS

| | | | |
|---|---|---|---|
| 777,287 | 12/1904 | Jones | 130/30 E |
| 788,088 | 4/1905 | Berndt | 130/27 HA |
| 861,189 | 7/1907 | Koger | 130/30 E |
| 959,346 | 5/1910 | Hummel | 130/30 E |
| 1,428,911 | 9/1922 | Sanders | 130/30 E |
| 2,334,461 | 11/1943 | Welty | 130/27 HA |
| 2,457,259 | 12/1948 | Moll | 130/30 E |
| 3,376,873 | 4/1968 | Herbsthofer | 56/14.6 |

FOREIGN PATENT DOCUMENTS 16593 8/1956 Fed. Rep. of Germany ........ 130/30 E Primary Examiner—Jay N. Eskovitz
Attorney, Agent, or Firm—Flehr, Hohbach, Test, Albritton & Herbert

[57] ABSTRACT

Apparatus for harvesting sesame seed from sesame stalks having pods thereon and having a framework with the cylinder structure rotatably mounted in the framework. A concave structure is also mounted in the framework in a fixed position in the framework and generally underlies the cylinder structure to form an entrance area, a separating area and an exit area in conjunction with the cylinder structure. A feeder is carried by the framework for delivering sesame stalks with the pods thereon, sesame seed pods and sesame seeds to the entrance area so that they are introduced between the cylinder structure and the concave structure and pass through the separating area for separating sesame seeds therefrom and discharging the remaining stalk and pod fragments through the exit area. Walker assemblies are utilized for removing the remaining stalk and pod fragments from the exit area. The cylinder structure and the concave structure each have rows of spaced apart blades which have knife-like leading edges for slicing open said sesame seed pods so that the sesame seeds may be readily separated from the pods. The blades are carried by cylindrical surfaces.

10 Claims, 6 Drawing Figures

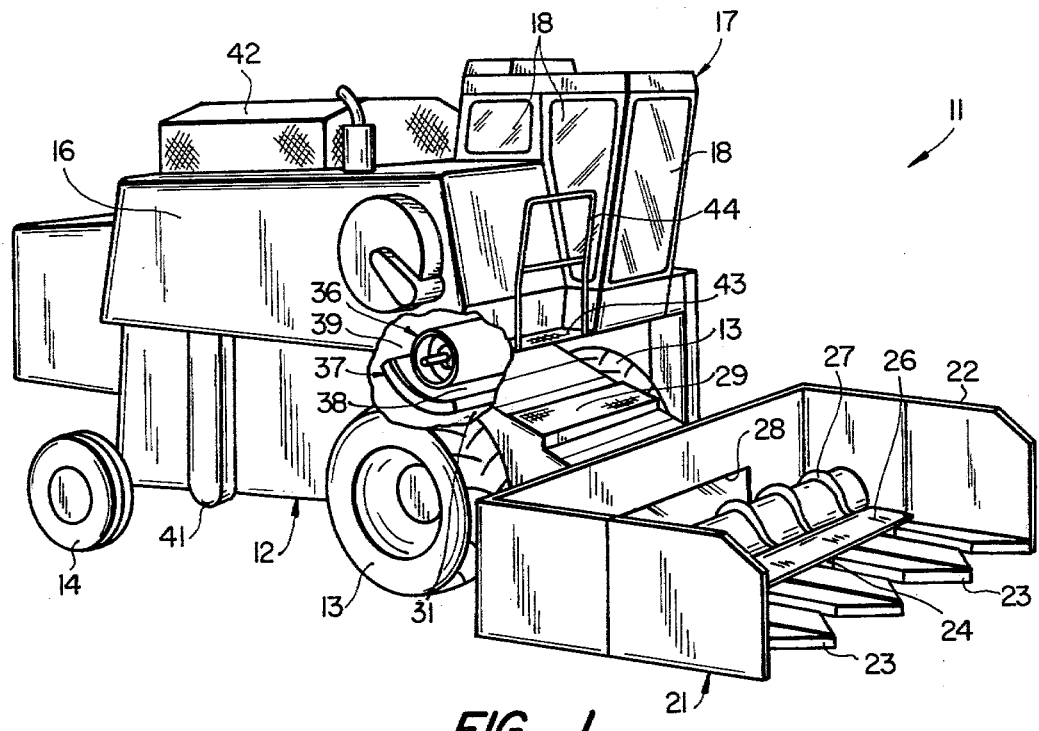
FIG_1
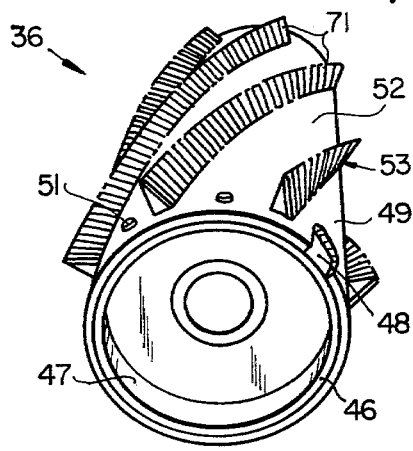
FIG_2
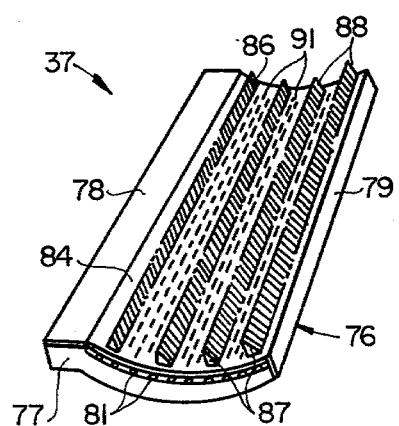
FIG_3
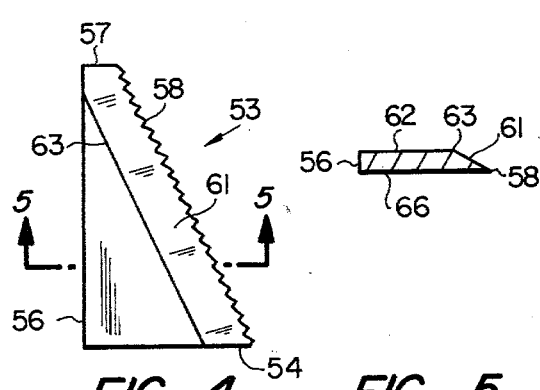
FIG_4   FIG_5
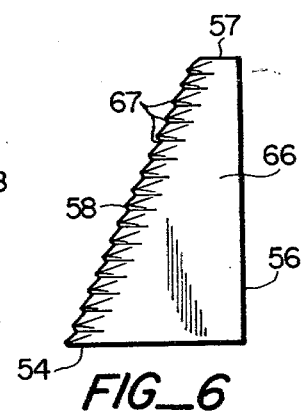
FIG_6

SESAME SEED HARVESTER

This is a continuation, of application Ser. No. 907,760 filed May 19, 1978 now abandoned.

BACKGROUND OF THE INVENTION

In attempting to harvest sesame seeds in the past with conventional power harvesters great difficulties have been encountered. Where spike teeth have been utilized, it has been found that sesame seed pods will go completely through the harvester without being broken apart. Alternatively, if the spike teeth are positioned more closely to prevent such pass through, it has been found that the sesame seeds are crushed. In harvesters utilizing rasp-like structures similar difficulties have been encountered in that when the spacing is sufficiently close to break the sesame seed pods, there is undue damage to the sesame seed. There is, therefore, need for a new and improved sesame seed harvester.

SUMMARY OF THE INVENTION AND OBJECTS

The apparatus for harvesting sesame seed from sesame stalks having pods thereon comprises a framework with a cylindrical structure rotatably mounted in the framework. A concave structure is mounted in a fixed position and generally underlies the cylindrical structure to form an entrance area, a separating area and an exit area in conjunction with the cylinder structure. Means is carried by the framework for delivering sesame seeds with pods thereon, sesame seed pods and sesame seeds to the entrance area so that they are introduced between the cylinder structure and the concave structure for separating the sesame seeds therefrom and for discharging the remaining stalk and pod fragments through the exit area. Means is provided for collecting sesame seeds as the sesame seeds are separated from the pods and stalks as they are advanced through the cylinder and concave structure. Means is also provided for removing the pod and stalk from the exit area. The cylinder structure and the concave structure are characterized in that each is provided with spaced apart rows of spaced apart blades having knife-like leading edges for slicing open the sesame seed pods.

In general, it is an object of the present invention to provide an apparatus for harvesting sesame seed which will accomplish the same without crushing substantial portions of the sesame seed being harvested.

Another object of the invention is to provide an apparatus of the above character which is particularly effective in slicing open sesame seed pods so that sesame seeds can be separated therefrom.

Another object of the invention is to provide a harvester of the above character which can readily accommodate the relatively coarse sesame seed stalks.

Another object of the invention is to provide an apparatus of the above character which can be incorporated into a conventional harvester.

Another object of the invention is to provide an apparatus of the above character in which the surfaces carrying the blades in the cylinder and concave structure can be readily replaced.

Additional objects and features of the invention will appear from the following description in which the preferred embodiment is set forth in detail in conjunction with the accompanying drawings.

BRIEF DESCRIPTION OF THE DRAWINGS

FIG. 1 is a perspective view of a sesame seed harvester incorporating the present invention.

FIG. 2 is a perspective view of a cylinder structure utilized in the harvester shown in FIG. 1 and incorporating the present invention.

FIG. 3 is a perspective view of a concave structure utilized in the harvester shown in FIG. 1 and also incorporating the present invention.

FIG. 4 is a front elevational view of one of the blades utilized in the cylinder structure.

FIG. 5 is a cross sectional view taken along line 5—5 of FIG. 4.

FIG. 6 is a rear elevational view of the blade shown in FIG. 4.

DESCRIPTION OF THE PREFERRED EMBODIMENT

The sesame seed harvester 11, as shown in the drawings, consists of a wheeled framework 12 which is provided with a pair of front driving wheels 13 and a pair of rear wheels 14. The front wheels 13 are driven by an engine (not shown) mounted in an engine compartment 16 mounted in the framework 12. An operator's cab 17 is mounted adjacent the engine compartment 16 and is provided with viewing windows 18.

The harvester also includes a header assembly 21 of the type described in copending application, Ser. No. 596,718, filed on July 17, 1975, abandoned in favor of continuation application, Ser. No. 776,872, filed on Mar. 11, 1977. As described therein, the header assembly is utilized for harvesting sesame seed from sesame stalks which are standing in rows in a field and having pods thereon carrying sesame seeds. The pods have a length of one inch or more and a diameter of from $\frac{3}{8}''$ to $\frac{1}{2}''$ and are of a type which have a tendency when fully ripe to shatter and release their seeds whenever they are moved or jarred. The header assembly 21 includes a rectangular framework 22 which is open on the front side and has mounted therein a plurality of spaced apart stalk guiding assemblies 23 spaced transversely of the framework 22 and in which pairs of the same form V-shaped stalk receiving recesses 24. Rotary cutters (not shown) are provided in the rear of the V-shaped recesses 24 for severing the stalks. The stalks fall onto an endless conveyor 26 which conveys the stalks and the pods into a feed auger 27. The feed auger 27 delivers the stalks and pods into an opening 28 where they are delivered into a feeder housing 29 which has mounted therein an endless conveyor (not shown) for delivering the stalks, pods and the like to an entrance area 31.

The entrance area 31 is defined by a cylinder structure 36 which is rotatably mounted in the framework 12 and which is driven by the engine in the engine compartment 16. It is also defined by concave structure 37 which is mounted in a fixed position in the framework 12 so that it underlies the cylinder structure 36. The concave structure has a curvature which corresponds to the curvature of the cylinder structure and is spaced from the concave structure to provide a separating area 38 which adjoins the entrance area and an exit area 39 which also adjoins the separating area. The stalks and pods are introduced into the entrance area, pass through the separating area, and the fragments are discharged through the exit area 39 onto walkers (not shown). The walkers deliver the stalk and pod fragments to the rear of the harvester and discharges same onto the ground.

The sesame seed travels to the bottom of the framework 12 and is elevated by an elevator (not shown) provided in an elevator housing 41 and delivers same to a bin 42. The framework is provided with a platform 43 in front of the engine compartment 16 which is provided with a hand rail 44.

The cylinder structure 36 which is used in the present invention and as shown particularly in FIG. 2 consists of a pair of circular end members 46 which are mounted within a cylindrical member 47 that is provided with a continuous cylindrical surface 48. A sleeve 49 is removably mounted on the member 47 and is secured thereto by suitable means such as bolts 51. The sleeve 49 is also cylindrical in form and is provided with a continuous cylindrical surface 52. A plurality of blades 43 are carried by the sleeve 49 and are mounted upon the cylindrical surface 52. The confirmation of the blades is shown particularly in FIGS. 4, 5 and 6.

The blades 53 are formed of a suitable material such as tool steel and have a suitable thickness as, for example, $\frac{1}{8}$ of an inch. These blades are provided with a bottom side or edge of a suitable length as, for example, 1 inch which is secured by suitable means, such as welding, to the surface 52 of the sleeve 49. The blades are generally in the form of a right triangle and thus have a rear side or edge 56 which extends at an angle of approximately 90° with respect to the bottom side 54 and has a suitable length as, for example, 2 inches. The upper portion of the triangle-like blade 53 is truncated as shown in FIGS. 4 and 6 and thus is provided with a short top side or edge 57. Each of the blades is provided with an inclined side or forward or leading edge 58 which is inclined at an angle from the vertical line formed by the rear edge 56. The side or edge 58 is serrated and knife-like and is defined by a bevel 61 formed into the front side so that a taper extends from a line 63 to the knife-like edge 58. The rear side 66 is provided with a plurality of parallel spaced apart serrations 67 which are cut into the back side surface 66 and which extend into the knife-like edge 58 to provide a serrated knife edge 58.

The blades 53 are mounted in a suitable manner such as by welding on the cylindrical surface 52 in such a manner so that they extend vertically from the surface 52 with the rear edge 56 extending outwardly in a radial direction from the cylindrical surface and the leading or cutting edge 58 being inclined from a radial direction and with the planes of the blades being perpendicular to the axis of rotation for the cylinder structure. The blades 53 are spaced apart a suitable distance as, for example, on $\frac{3}{4}$ inch centers so that there is a $\frac{5}{8}$ inch space between the same. The blades are mounted in rows 71 which are spaced apart a suitable distance as, for example, 6 inches. The rows 71, as shown in FIG. 2, are in the form of helices for a purpose hereinafter described.

The concave structure 37 consists of a framework 76 which has a pair of end plates 77 which have a curved configuration and which are fastened together by a pair of longitudinally extending plates 78 and 79. A curved support structure 81 is mounted between the end plates and can be in a suitable form such as rods or a curved plate. A removable member 84 is secured to the framework 76 by suitable means such as bolts (not shown). The removable member 84 is provided with a curved surface 86 which has a curvature which corresponds to the curvature defined by the outer extremities of the blades 53 carried by the cylinder structure 36. It subtends a suitable angle as, for example, from 70° to 120°, and preferably 90°.

A plurality of blades 87 substantially identical to the blades 53 provided as a part of the cylinder structure 36 are secured to the removable member 84 and form a part of the concave structure 37. The blades 87 are also spaced apart a similar distance as the blades 53 as, for example, $\frac{3}{4}$ of an inch on centers with a $\frac{5}{8}$ inch spacing therebetween. The blades 87 are arranged in rows 88 which are spaced apart a suitable distance as, for example, 6 inches. The rows 88 are straight and extend in a direction which is parallel to the axis of rotation of the cylinder structure 36. The blades 87 are offset longitudinally of the axis of rotation for the cylinder structure 36 and from the blades of the cylinder structure 36 in such a manner so that the blades 53 of the cylinder structure 36 pass between the blades 87 of the concave structure. Preferably, the spacing between the blades 53 of the cylinder structure 36 and the blades 87 of the concave structure is such so that the blades of the cylinder structure are equally spaced from the blades of the concave structure. Thus, if the blades are $\frac{3}{4}$ of an inch apart on centers, there would be 5/16 inch clearance between the blades of the concave structure and the blades of the cylinder structure. The concave structure is positioned in such a manner so that the blades of the cylinder structure travel between the blades of the cylinder structure.

A plurality of elongate slots or holes 91 are formed in the removable member 84 and are positioned between the rows 88 of blades 87 and are sized in such a manner so that sesame seeds can readily pass through the same and drop downwardly into the harvester where they can be collected for pick up by the elevator in the elevator housing 41. The holes 91 can be provided in any desired pattern in the member 84. However as shown, the holes 91 can be arranged in spaced apart rows in such a manner so that the holes are staggered with respect to each other.

The concave structure and the cylinder structure both can be removed from the harvester if desired to facilitate replacement of the members which carry the cutting blades 53 and 87. In this way, the cutting blades can be readily replaced when they become dull or are broken.

Operation of the harvester may be briefly described as follows. As shown, the sesame seed harvester is of a type which is a self-propelled unit which can be moved through the field. However, it should be understood that the present invention can be utilized in a stationary harvester if desired. Assuming that it is desired to harvest sesame seed from the field, the harvester is moved down the rows. The header assembly 21 severs the stalks and delivers them to the feeder housing 29 and into the entrance area 31. The stalks and pods enter into the entrance area 31 under the action of the cylinder structure which is rotating rapidly to bring the stalks and pods into contact with the blades 53 and 87. The sesame seed pods are characterized by having a very tough outer shell. The blades 53 and 87 are positioned relatively close together so that the pods cannot pass through the concave structure and the cylinder structure without being cut open. The very sharp leading edges of the blades readily cut or slice through the tough sesame seed pods and cause the sesame seeds therein to be emptied downwardly into the concave structure 37 and to pass through the holes 91 provided in the curved member 84. The severed stalk and pod fragments pass through the separating area 38 during which time substantially all of the sesame seeds are released therefrom. The stalk and pod fragments are then delivered to the exit area after which they fall onto walkers in which the remaining sesame seeds are shaken from the stalks and pods to permit the seed to drop downwardly into the bottom portion of the harvester to be picked up by the elevator and delivered to the grain bin. The stalk and pod fragments are eventually discharged at the rear of the machine.

It has been found that the use of the knife-like cutting blades makes it possible to readily slice open the pods carrying the sesame seeds and to cause the sesame seeds to be released therefrom without substantially crushing or damaging the sesame seed. The helical arrangement of the rows of teeth carried by the cylinder structure make it possible for the harvester to handle the relatively tough thick stalks of the sesame plant without causing undue vibration or wear and tear on the machine. This is because any individual sesame stalk is progressively advanced into the cutting blades of the concave structure by the helical rows of blades on the cylinder structure rather than all of the stalk being delivered simultaneously to the cutting blades of the concave structure.

The remaining detailed operation of the harvester is substantially conventional and thus will not be described in further detail. The construction of the cylinder structure and the concave structure is particularly important in that it makes it possible to harvest sesame seed without causing substantial damage to the sesame seed.

What is claimed is:

1. In an apparatus for harvesting sesame seed from sesame stalks having pods thereon, a framework, a cylinder structure rotatably mounted in the framework, means for rotating said cylinder structure about an axis of rotation, a concave structure mounted in a fixed position in said framework and generally underlying said cylinder structure to form an entrance area, a separating area and an exit area in cooperation with the cylinder structure, means carried by the framework for delivering sesame stalks with pods thereon, sesame seed pods and sesame seeds to said entrance area so that they are introduced between the cylinder structure and the concave structure in a direction substantially at right angles to the direction of rotation of the cylinder structure and thereafter pass through the separating area with the stalk and pod fragments being discharged through the exit area and also in a direction substantially at right angles to the direction of rotation of the cylinder structure, the concave structure being formed in such a manner so that at least some of the sesame seeds which are separated from the pods can drop through the concave structure, means for moving the stalk and pod fragments from the exit area and means for collecting sesame seeds as sesame seeds are separated from the pod and stalk fragments as they are advanced through the separating area and from the exit area, said cylinder structure and said concave structure each having a plurality of spaced apart rows of spaced apart blades having knife-like leading edges for slicing open said pods so that sesame seeds may be readily separated from the pods, the rows of spaced apart blades on one of said structures being inclined at an angle with respect to the axis of rotation of the cylinder structure so that the cutting action of said blades will be progressive, said cylinder structure comprising a member having a continuous cylindrical surface and wherein said blades of said cylinder structure are secured in spaced apart rows on said cylindrical surface.

2. Apparatus as in claim 1 wherein said leading edges of said blades on said cylinder structure are serrated and are inclined from radially extending lines of the cylinder structure.

3. Apparatus as in claim 1, wherein said rows on said surface of said cylinder structure are in the form of helices.

4. Apparatus as in claim 1 wherein said concave structure comprises a member having a substantially continuous surface conforming to a portion of the cylinder having a diameter substantially the same as the diameter of the cylinder member and wherein said blades are secured in spaced apart rows on said surface of the concave structure.

5. Apparatus as in claim 4 wherein said rows of said concave structure are straight rows.

6. Apparatus as in claim 4 wherein the leading edges of the blades on the concave structure are inclined away from radially extending lines of the concave structure.

7. Apparatus as in claim 4 wherein said member of said concave structure is provided with openings between the blades through which sesame seeds can pass.

8. Apparatus as in claim 1 wherein said framework is wheeled.

9. Apparatus as in claim 1 wherein said member of said cylinder structure having the blades mounted thereon is removable so that it can be readily replaced.

10. Apparatus as in claim 4 wherein said member of said concave structure having the blades thereon is removable so that it can be readily replaced.

* * * * *